US008636620B2

(12) United States Patent
Nagashima et al.

(10) Patent No.: US 8,636,620 B2
(45) Date of Patent: Jan. 28, 2014

(54) AUTOMATIC TRANSMISSION

(75) Inventors: Fumitaka Nagashima, Fuji (JP);
Hajime Tasaka, Fuji (JP); Takateru Kawaguchi, Susono (JP); Takeo Aizawa, Hachioji (JP); Kakuzou Kaneko, Ebina (JP)

(73) Assignee: JATCO Ltd, Fuji-shi (JP)

( * ) Notice: Subject to any disclaimer, the term of this patent is extended or adjusted under 35 U.S.C. 154(b) by 158 days.

(21) Appl. No.: 13/281,939

(22) Filed: Oct. 26, 2011

(65) Prior Publication Data
US 2012/0108391 A1 May 3, 2012

(30) Foreign Application Priority Data

Oct. 28, 2010 (JP) ................................. 2010-242609
Oct. 24, 2011 (JP) ................................. 2011-232851

(51) Int. Cl.
*B60W 10/02* (2006.01)
(52) U.S. Cl.
USPC ................. 477/5; 477/176; 701/61; 701/33.8
(58) Field of Classification Search
USPC ........... 477/5, 176; 701/51, 61, 67, 33.7–34.1
See application file for complete search history.

(56) References Cited

U.S. PATENT DOCUMENTS

| 5,361,213 A | 11/1994 | Fujieda et al. |
| 5,697,479 A | 12/1997 | Kono et al. |
| 5,800,308 A | 9/1998 | Tsutsui et al. |
| 5,871,419 A | 2/1999 | Amendt |
| 5,916,058 A | 6/1999 | Sakai et al. |
| 5,944,632 A | 8/1999 | Hara et al. |
| 6,022,295 A | 2/2000 | Liu |
| 6,033,340 A | 3/2000 | Amendt et al. |
| 6,033,342 A | 3/2000 | Steinel et al. |
| 6,110,072 A | 8/2000 | Harada et al. |
| 6,135,919 A | 10/2000 | Shimakura |

(Continued)

FOREIGN PATENT DOCUMENTS

| EP | 1 972 833 A2 | 9/2008 |
| JP | 60-136662 A | 7/1985 |

(Continued)

OTHER PUBLICATIONS

H. Akebono, U.S. PTO Office Action, U.S. Appl. No. 13/283,991, dated Mar. 14, 2013, 10 pages.

(Continued)

*Primary Examiner* — Derek D Knight
(74) *Attorney, Agent, or Firm* — Foley & Lardner LLP

(57) ABSTRACT

An automatic transmission has a transmission control section performing a control so that a transmission ratio defined as input rpm/output rpm of the automatic transmission becomes a target transmission ratio, a slip control section slip-controlling a frictional engagement element in the automatic transmission so that the input rpm becomes a value obtained by multiplying the output rpm by the target transmission ratio also adding a predetermined slip revolution speed; and an abnormality judgment section judging abnormality in the automatic transmission. When the slip-control is not in progress, if an actual transmission ratio is out of a predetermined range of the target transmission ratio, the abnormality judgment section judges that abnormality occurs. When the slip-control is in progress, if a value obtained by correcting the actual transmission ratio on the basis of the slip revolution speed is out of the predetermined range, the abnormality judgment section judges that abnormality occurs.

9 Claims, 9 Drawing Sheets

(56) References Cited

U.S. PATENT DOCUMENTS

| | | |
|---|---|---|
| 6,253,137 B1 | 6/2001 | Abo et al. |
| 6,494,810 B1 | 12/2002 | Mack et al. |
| 6,527,672 B1 | 3/2003 | Henneken et al. |
| 6,565,473 B2 | 5/2003 | Endo et al. |
| 6,602,160 B2 | 8/2003 | Tsutsui |
| 6,658,341 B2 | 12/2003 | Inoue et al. |
| 6,769,502 B2 | 8/2004 | Nakamori et al. |
| 7,089,095 B2 | 8/2006 | Takami et al. |
| 7,226,383 B2 | 6/2007 | Namba |
| 7,359,785 B2 | 4/2008 | Yoshida et al. |
| 7,404,460 B2 | 7/2008 | Oshidari |
| 7,465,250 B2 | 12/2008 | Tamai et al. |
| 7,610,891 B2 | 11/2009 | Seufert et al. |
| 7,730,982 B2 | 6/2010 | Hidaka et al. |
| 7,828,096 B2 | 11/2010 | Hoher et al. |
| 7,980,981 B2 | 7/2011 | Kawaguchi et al. |
| 8,037,858 B2 | 10/2011 | Seufert et al. |
| 8,108,115 B2 | 1/2012 | Kobayashi et al. |
| 8,170,762 B2 | 5/2012 | Foster et al. |
| 8,187,151 B2 | 5/2012 | Gloge |
| 8,216,112 B2 | 7/2012 | Gibson et al. |
| 8,297,249 B2 | 10/2012 | Seufert et al. |
| 8,393,998 B2 | 3/2013 | Akebono et al. |
| 2002/0107103 A1 | 8/2002 | Nakamori et al. |
| 2004/0157704 A1 | 8/2004 | Stork et al. |
| 2005/0102082 A1 | 5/2005 | Joe et al. |
| 2005/0215393 A1 | 9/2005 | Shimoda |
| 2005/0222735 A1 | 10/2005 | Usuki et al. |
| 2007/0142142 A1 | 6/2007 | Yamaguchi et al. |
| 2007/0204817 A1 | 9/2007 | Russell et al. |
| 2008/0011529 A1 | 1/2008 | Hoher et al. |
| 2008/0017427 A1 | 1/2008 | Nakanowatari |
| 2008/0220937 A1 | 9/2008 | Nozaki et al. |
| 2008/0234088 A1 | 9/2008 | Kawaguchi et al. |
| 2009/0112423 A1 | 4/2009 | Foster et al. |
| 2009/0143189 A1 | 6/2009 | Hasegawa et al. |
| 2010/0018808 A1 | 1/2010 | Gloge |
| 2010/0056328 A1 | 3/2010 | Schenk et al. |
| 2010/0197451 A1 | 8/2010 | Kaltenbach et al. |
| 2010/0204862 A1 | 8/2010 | Uejima et al. |
| 2011/0082630 A1* | 4/2011 | Kawaguchi et al. ............ 701/58 |
| 2011/0256978 A1 | 10/2011 | Falkenstein |
| 2011/0276207 A1 | 11/2011 | Falkenstein |
| 2012/0105925 A1 | 5/2012 | Shirai et al. |
| 2012/0108388 A1 | 5/2012 | Akebono et al. |
| 2012/0109438 A1 | 5/2012 | Akebono et al. |
| 2012/0109439 A1 | 5/2012 | Akebono et al. |
| 2012/0203406 A1 | 8/2012 | Akebono et al. |
| 2013/0218391 A1* | 8/2013 | Aizawa et al. ................. 701/22 |
| 2013/0218392 A1* | 8/2013 | Aizawa et al. ................. 701/22 |

FOREIGN PATENT DOCUMENTS

| | | |
|---|---|---|
| JP | 2000-170888 A | 6/2000 |
| JP | 2001-018690 A | 1/2001 |
| JP | 2008-232355 A | 10/2008 |
| JP | 2010-179860 A | 8/2010 |
| JP | 2010-195363 A | 9/2010 |

OTHER PUBLICATIONS

H. Akebono, U.S. PTO Notice of Allowance, U.S. Appl. No. 13/283,974, dated Nov. 23, 2012, 13 pages.

S. Mochiyama, U.S. PTO Office Action, U.S. Appl. No. 13/281,990, dated Nov. 30, 2012, 10 pages.

H. Akebono, U.S. PTO Notice of Allowance, U.S. Appl. No. 13/283,938, dated Dec. 28, 2012, 14 pages.

U.S. Appl. No. 13/361,640, filed Jan. 30, 2012, Akebono et al.

U.S. Appl. No. 13/283,991, filed Oct. 28, 2011, Akebono et al.

U.S. Appl. No. 13/283,938, filed Oct. 28, 2011, Akebono et al.

U.S. Appl. No. 13/283,974, filed Oct. 28, 2011, Akebono et al.

U.S. Appl. No. 13/283,954, filed Oct. 28, 2011, Akebono et al.

U.S. Appl. No. 13/283,909, filed Oct. 28, 2011, Mochiyama et al.

U.S. Appl. No. 13/281,990, filed Oct. 26, 2011, Mochiyama et al.

S. Mochiyama, U.S. PTO Office Action, U.S. Appl. No. 13/283,909, dated May 3, 2012, 12 pages.

S. Mochiyama, U.S. PTO Office Action, U.S. Appl. No. 13/281,990, dated May 10, 2013, 10 pages.

H. Akebono, U.S. PTO Office Action, U.S. Appl. No. 13/283,954, dated Jul. 9, 2013, 28 pages.

H. Akebono, U.S. PTO Notice of Allowance, U.S. Appl. No. 13/283,991, dated Jul. 9, 2013, 10 pages.

S. Mochiyama, U.S. PTO Office Action, U.S. Appl. No. 13/281,990 dated Sep. 9, 2013, 12 pages.

S. Mochiyama, U.S. PTO Office Action, U.S. Appl. No. 13/263,909 dated Sep. 10, 2013, 9 pages.

H. Akebono, U.S. PTO Notice of Allowance, U.S. Appl. No. 13/361,640, dated Oct. 30, 2013, 20 pages.

* cited by examiner

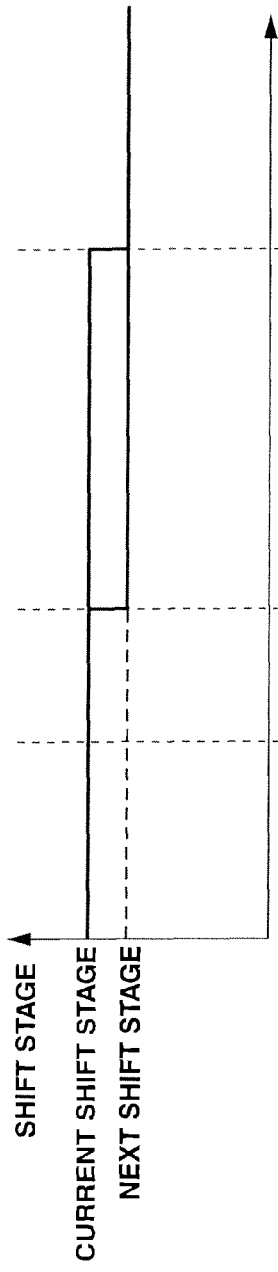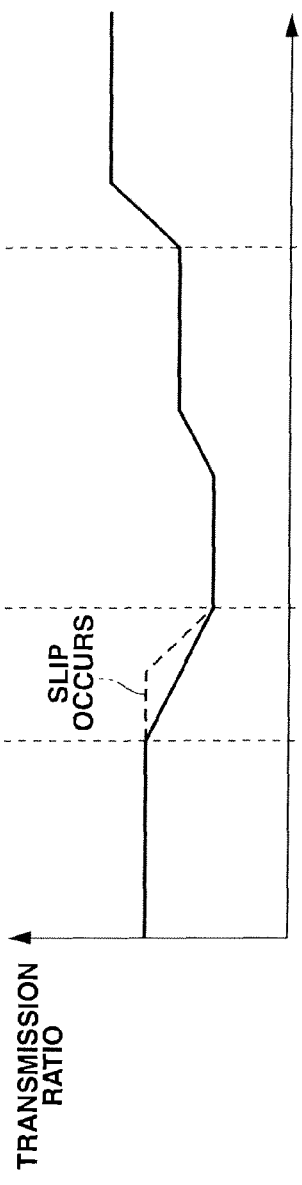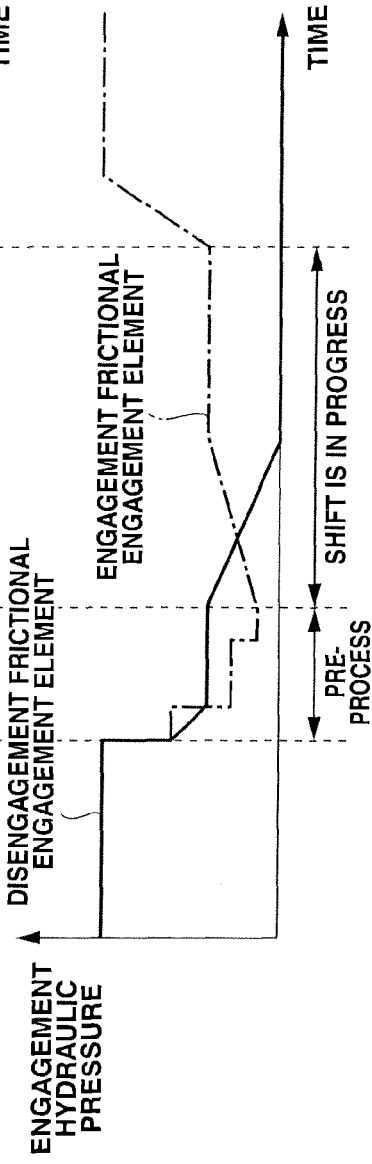

AUTOMATIC TRANSMISSION

BACKGROUND OF THE INVENTION

The present invention relates to an automatic transmission.

As a technique for judging an occurrence of interlock of an automatic transmission, for example, it is disclosed in Japanese Patent Provisional Publication No. 2008-232355 (hereinafter is referred to as "JP2008-232355"). JP2008-232355 discloses an interlock judgment technique in which, when deceleration of a vehicle is greater than or equal to a predetermined deceleration also an actual gear ratio determined from an input revolution speed and an output revolution speed of an automatic transmission is out of a predetermined range that is set on the basis of a gear ratio of a speed that is currently commanded or instructed, it is judged that the interlock occurs.

SUMMARY OF THE INVENTION

In JP2008-232355, however, when a slip control is executed so that the input revolution speed of the automatic transmission becomes a value obtained by multiplying the output revolution speed of the automatic transmission by the gear ratio of the commanded speed also by adding a predetermined slip revolution speed, since the input revolution speed becomes higher than the output revolution speed, there is a possibility that misjudgment of abnormality in the gear ratio including the interlock will occur.

For this problem, it is therefore an object of the present invention to provide an automatic transmission that is capable of reducing the misjudgment of the abnormality in the automatic transmission even during execution of the slip control.

According to one aspect of the present invention, an automatic transmission which changes and outputs an output revolution speed of a driving source that outputs a driving torque in a vehicle, comprises: a transmission control section that performs a control so that a transmission ratio defined as a ratio of an input revolution speed of the automatic transmission with respect to an output revolution speed of the automatic transmission becomes a target transmission ratio; a slip control section that slip-controls a frictional engagement element in the automatic transmission so that the input revolution speed of the automatic transmission becomes a value obtained by multiplying the output revolution speed of the automatic transmission by the target transmission ratio also adding a predetermined slip revolution speed; and an abnormality judgment section that judges that (a) when the slip control is not in progress, if an actual transmission ratio is out of a predetermined range of the target transmission ratio, abnormality occurs in the automatic transmission, and (b) when the slip control is in progress, if a value obtained by correcting the actual transmission ratio on the basis of the slip revolution speed is out of the predetermined range of the target transmission ratio, the abnormality occurs in the automatic transmission.

According to another aspect of the invention, an automatic transmission provided, through a frictional engagement element, with a driving torque that is outputted by a driving source in a vehicle, the automatic transmission changing a revolution speed which the driving source outputs and outputting the revolution speed to a driving wheel, the automatic transmission comprises: a first revolution speed sensor that is provided between the driving source and the frictional engagement element and detects an input revolution speed that is a revolution speed at an input shaft side of the automatic transmission; a second revolution speed sensor that is provided between the automatic transmission and the driving wheel and detects an output revolution speed that is a revolution speed at an output shaft side of the automatic transmission; a transmission control section that performs a control so that a transmission ratio defined as a ratio of the input revolution speed with respect to the output revolution speed becomes a target transmission ratio; a slip control section that slip-controls the frictional engagement element so that the input revolution speed becomes a value obtained by multiplying the output revolution speed by the target transmission ratio also adding a predetermined slip revolution speed; and an abnormality judgment section that judges that (a) when the slip control is not in progress, if an actual transmission ratio is out of a predetermined range of the target transmission ratio, abnormality occurs in the automatic transmission, and (b) when the slip control is in progress, if a value obtained by correcting the actual transmission ratio on the basis of the slip revolution speed is out of the predetermined range of the target transmission ratio, the abnormality occurs in the automatic transmission.

According to a further aspect of the invention, an automatic transmission changing a revolution speed outputted by a driving source that outputs a driving torque of a vehicle and outputting the changed revolution speed to a driving wheel through a frictional engagement element, comprises: a first revolution speed sensor that is provided between the driving source and the automatic transmission and detects an input revolution speed that is a revolution speed at an input shaft side of the automatic transmission; a second revolution speed sensor that is provided between the frictional engagement element and the driving wheel and detects an output revolution speed that is a revolution speed at an output shaft side of the automatic transmission; a transmission control section that performs a control so that a transmission ratio defined as a ratio of the input revolution speed with respect to the output revolution speed becomes a target transmission ratio; a slip control section that slip-controls the frictional engagement element so that the input revolution speed becomes a value obtained by multiplying the output revolution speed by the target transmission ratio also adding a predetermined slip revolution speed; and an abnormality judgment section that judges that (a) when the slip control is not in progress, if an actual transmission ratio is out of a predetermined range of the target transmission ratio, abnormality occurs in the automatic transmission, and (b) when the slip control is in progress, if a value obtained by correcting the actual transmission ratio on the basis of the slip revolution speed is out of the predetermined range of the target transmission ratio, the abnormality occurs in the automatic transmission.

The other objects and features of this invention will become understood from the following description with reference to the accompanying drawings.

BRIEF DESCRIPTION OF THE DRAWINGS

FIGS. 12A-12C are time charts when speed (shift stage) changes.

DETAILED DESCRIPTION OF THE INVENTION

According to the present invention, when a slip control is in progress, if a value obtained by correcting an actual transmission ratio on the basis of a slip revolution speed is out of a predetermined range of a target transmission ratio, it is judged that the abnormality occurs in the automatic transmission.

It is therefore possible to reduce the misjudgment of the abnormality in the automatic transmission even during execution of the slip control.

Embodiments of the present invention will now be explained below with reference to the drawings.

[Embodiment 1]
[Drive System]

Figure 1:
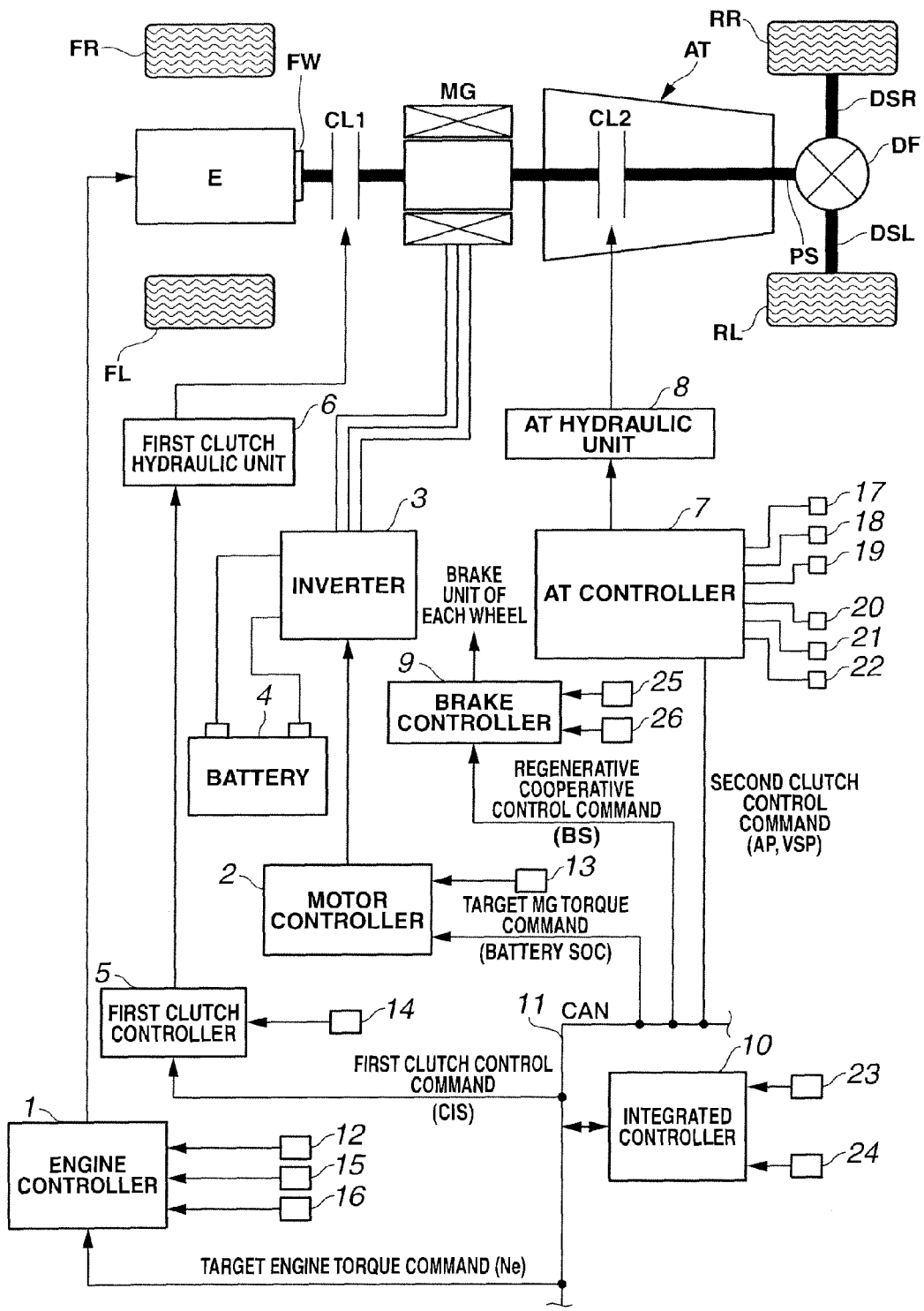
FIG. 1 is a whole system block diagram showing a hybrid vehicle of an embodiment 1.

First, a drive system of a hybrid vehicle will be explained. FIG. 1 is a whole system block diagram showing a rear-drive hybrid vehicle of the embodiment 1.

The drive system of the hybrid vehicle in the embodiment 1 has an engine E, a first clutch CL1, a motor/generator MG, a second clutch CL2, an automatic transmission AT, a propeller shaft PS, a differential gear DF, a left drive shaft DSL, a right drive shaft DSR, a rear left wheel RL (driving wheel), and a rear right wheel RR (driving wheel). Needless to say, FL is a front left wheel, and FR is a front right wheel.

The engine E is, for instance, a gasoline engine, and a valve opening of throttle valve etc. is controlled on the basis of a control command from an after-mentioned engine controller 1. As shown in FIG. 1, a flywheel FW is provided at an engine output shaft.

The first clutch CL1 is a clutch that is arranged between the engine E and the motor/generator MG. Engagement/slip-engagement/disengagement of the first clutch CL1 are controlled by a control pressure that is produced by a first clutch hydraulic unit 6 on the basis of a control command from an after-mentioned first clutch controller 5.

The motor/generator MG is a synchronous type motor/generator in which a permanent magnet is embedded in a rotor and a stator coil is wound around a stator. The motor/generator MG is controlled through the application of a three-phase alternating current that is generated by an inverter 3 on the basis of a control command from an after mentioned motor controller 2. This motor/generator MG works as an electric motor that performs a rotational drive operation by receiving a power from a battery 4 (hereinafter, this state is called a power running state).

And also, in a case where the rotor is rotated by an external force, the motor/generator MG works as a generator that generates an electromotive force at both ends of the stator coil, and is able to charge the battery 4 (hereinafter, this operating state is called a regenerative state). Here, the rotor of this motor/generator MG is connected to an input shaft of the automatic transmission AT through a damper (not shown).

The second clutch CL2 is a clutch that is arranged between the motor/generator MG and the rear left and rear right wheels RL, RR. Engagement/slip-engagement/disengagement of the second clutch CL2 are controlled by a control pressure that is produced by an AT hydraulic unit 8 on the basis of a control command from an after-mentioned AT controller 7.

The automatic transmission AT is a transmission that automatically changes a transmission ratio of multispeed (multistage) of, for example, forward 7 speeds and reverse 1 speed according to a vehicle speed and an accelerator opening and so on. Here, the above second clutch CL2 is not a clutch that is newly added as a special clutch. The second clutch CL2 is a frictional engagement element used as one of a plurality of frictional engagement elements which are engaged in each speed or each shift stage in the automatic transmission AT.

An output shaft of the automatic transmission AT is connected to the rear left and rear right wheels RL, RR through the propeller shaft PS as a vehicle drive shaft, the differential gear DF, the left drive shaft DSL and the right drive shaft DSR. Here, with regard to the first and second clutches CL1 and CL2, for example, a wet multiple disc clutch whose hydraulic flow amount and hydraulic pressure can be continuously controlled by a proportional solenoid is used.

This hybrid drive system has three drive modes in accordance with a state of the engagement/disengagement of the first clutch CL1. A first drive mode is an electric vehicle drive mode (hereinafter called an EV drive mode) as a motor-used drive mode in which the first clutch CL1 is in a disengaged state and the vehicle travels by only the power of the motor/generator MG as the power source. A second drive mode is an engine-used drive mode (hereinafter called an HEV drive mode) in which the first clutch CL1 is in an engaged state and the vehicle travels while including the engine E as the power source. A third drive mode is an engine-used slip drive mode (hereinafter called a WSC drive mode) in which the first clutch CL1 is in the engaged state and the second clutch CL2 is slip-controlled then the vehicle travels while including the engine E as the power source. This mode is a mode that is capable of achieving a creep drive especially when a state of charge of a battery (SOC) is low or an engine water temperature is low. Here, when changing the mode from the EV drive mode to the HEV drive mode, the first clutch CL1 is engaged, and the engine start is carried out by using the torque of the motor/generator MG.

When an accelerator hill hold control in which a driver controls an accelerator pedal and maintains a vehicle stop state on an uphill whose road slope or gradient is a predetermined value or greater is carried out, since a revolution speed of the engine E cannot be set to be lower than an idle speed, an undesirable state in which a slip amount of the second clutch CL2 is too large might continue in the case of the WSC drive mode. Accordingly, in the embodiment 1, the hybrid drive system further has a motor slip drive mode (hereinafter called an MWSC drive mode) in which the first clutch CL1 is disengaged while the engine E is working, and the second clutch CL2 is slip-controlled while the motor/generator MG is working, then the vehicle travels with the motor/generator MG being the power source. Details will be described later.

With regard to the HEV drive mode, it has three drive modes; an engine drive mode, a motor assist drive mode, and a travelling power generation mode.

The engine drive mode is a mode that drives the driving wheels with only the engine E being the power source. The motor assist drive mode is a mode that drives the driving wheels with both of the engine E and the motor/generator MG being the power source. The travelling power generation mode is a mode that drives the driving wheels RL, RR with the engine E being the power source also simultaneously operates the motor/generator MG as the generator.

At a constant speed drive and an acceleration drive, the motor/generator MG works as the generator by using the power of the engine E. At a deceleration drive, by receiving a regenerative brake energy, the motor/generator MG generates the power, and this power is used to charge the battery 4.

Furthermore, as another mode, the hybrid drive system has a power generation mode in which the motor/generator MG works as the generator at the vehicle stop by using the power of the engine E.

[Control System]

Next, a control system of the hybrid vehicle will be explained. As shown in FIG. 1, the control system of the hybrid vehicle has the engine controller 1, the motor controller 2, the inverter 3, the battery 4, the first clutch controller 5, the first clutch hydraulic unit 6, the AT controller 7, the AT hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

The engine controller 1 inputs information of an engine revolution speed (an engine rpm) Ne from an engine rpm sensor 12, an accelerator pedal opening APO from an accelerator pedal opening sensor 15, the throttle opening from a throttle opening sensor 16. The engine controller 1 outputs a command that controls an engine operating or working point (Ne: the engine revolution speed, Te: an engine torque) to, for instance, a throttle valve actuator (not shown in the drawing) in accordance with a target engine torque command etc. from the integrated controller 10. Here, information concerning the engine revolution speed Ne etc. is sent to the integrated controller 10 via the CAN communication line 11.

The motor controller 2 inputs information from a resolver 13 that detects a rotation position of the rotor of the motor/generator MG, and outputs a command that controls a motor operating or working point (Nm: a motor/generator revolution speed, Tm: a motor/generator torque) of the motor/generator MG to the inverter 3 in accordance with a target motor/generator torque command etc. from the integrated controller 10. Here, this motor controller 2 checks or watches the battery SOC indicating the charge state of the battery 4. The information of this battery SOC is used as control information of the motor/generator MG, and also is sent to the integrated controller 10 via the CAN communication line 11.

The first clutch controller 5 inputs information of a first clutch hydraulic pressure PCL1 from a first clutch hydraulic pressure sensor 14, and outputs a command that controls the engagement/disengagement of the first clutch CL1 to the first clutch hydraulic unit 6 in accordance with a first clutch control command from the integrated controller 10.

The AT controller 7 inputs information from a side brake (or hand brake or parking brake) switch 17, a brake switch 18, an inhibitor switch 19 that outputs a signal corresponding to a shift lever position operated by the driver, an input rpm sensor 20 that detects an input revolution speed Nin inputted to the automatic transmission AT, an output rpm sensor 21 that detects an output revolution speed Nout outputting from the automatic transmission AT, and a second clutch hydraulic pressure sensor 22 that detects a second clutch hydraulic pressure PCL2. The AT controller 7 determines a shift position according to the input information, and outputs a command that controls the engagement/disengagement of each engagement element to the AT hydraulic unit 8 on the basis of the determined shift position. Here, information of the inhibitor switch, the input revolution speed Nin, the output revolution speed Nout, etc. is sent to the integrated controller 10 via the CAN communication line 11.

The brake controller 9 inputs sensor information from a wheel speed sensor 25 that detects each wheel speed of the four wheels and a brake stroke sensor 26. In addition, for instance, when a braking force by only a regenerative braking force is insufficient for a required braking force determined by a brake stroke BS upon a brake operation by driver's brake pedal depression, the brake controller 9 performs a regenerative brake cooperative control on the basis of a regenerative cooperative control command from the integrated controller 10 so that the shortage of the braking force is compensated by a mechanical braking force (a braking force by a friction brake).

The integrated controller 10 is a controller that controls a consumption energy of the whole vehicle, and performs the operation in order for the hybrid vehicle to travel at a maximum efficiency. The integrated controller 10 inputs an oil temperature in the automatic transmission AT from an AT oil temperature sensor 23 and a back-and-forth acceleration from a back-and-forth acceleration sensor 24, also inputs information obtained via the CAN communication line 11.

Further, the integrated controller 10 performs an operating control of the engine E by the control command to the engine controller 1, an operating control of the motor/generator MG by the control command to the motor controller 2, the engagement/disengagement control of the first clutch CL1 by the control command to the first clutch controller 5, and the engagement/disengagement control of the second clutch CL2 by the control command to the AT controller 7.

[Configuration of Integrated Controller]

Figure 2:
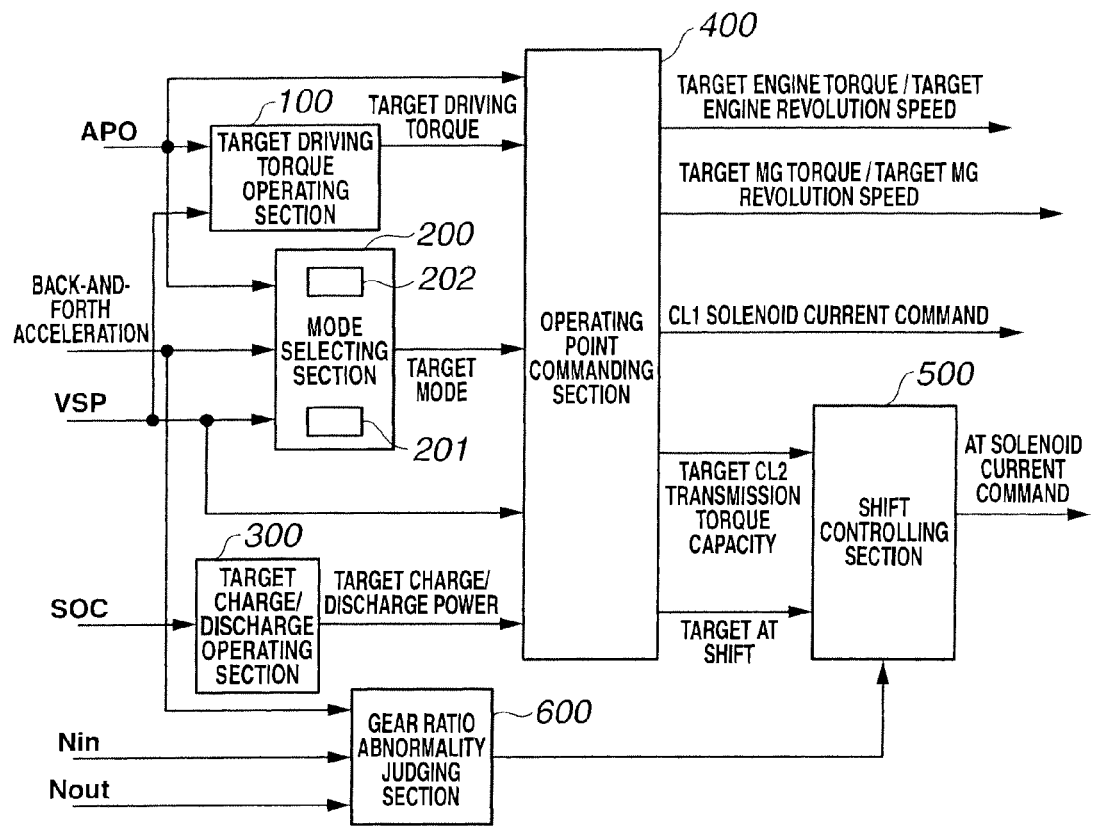
FIG. 2 is a control block diagram of an integrated controller of the embodiment 1.

FIG. 2 is a control block diagram of the integrated controller 10. In the following description, a control executed in the integrated controller 10 of the embodiment 1 will be explained with reference to the control block diagram in FIG. 2. This operation is executed for instance at a control cycle period 10 msec in the integrated controller 10. The integrated controller 10 has a target driving torque operating section 100, a mode selecting section 200, a target charge/discharge operating section 300, an operating point commanding section 400, a speed change or shift change controlling section (simply, a shift controlling section) 500 and a gear ratio abnormality judging section 600.

Figure 3:
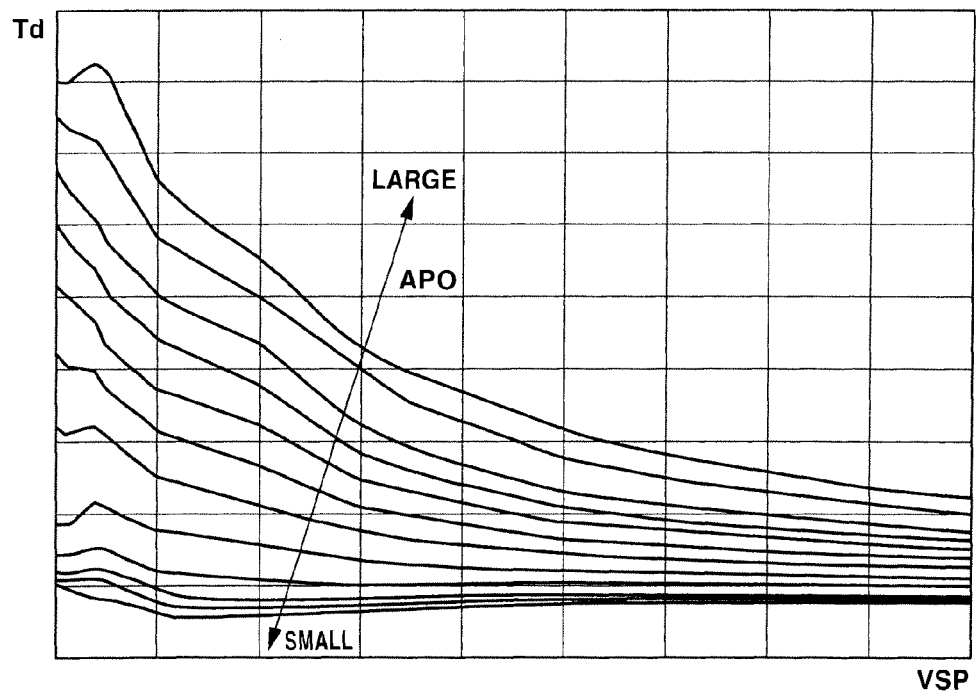
FIG. 3 is a target driving torque map of the embodiment 1.

FIG. 3 is a target driving torque map. The target driving torque operating section 100 calculates a target driving torque Td on the basis of the accelerator pedal opening APO and the vehicle speed VSP using the target driving torque map shown in FIG. 3.

The mode selecting section 200 has a road slope estimation operating section 201 that estimates a slope or a gradient of road on the basis of a detection value of the back-and-forth acceleration sensor 24. The road slope estimation operating section 201 calculates an actual acceleration from an average of acceleration of the wheel speed etc. detected by the wheel speed sensor 25, and estimates the road slope on the basis of a difference between this calculation result and the back-and-forth acceleration sensor detection value.

Figure 4:
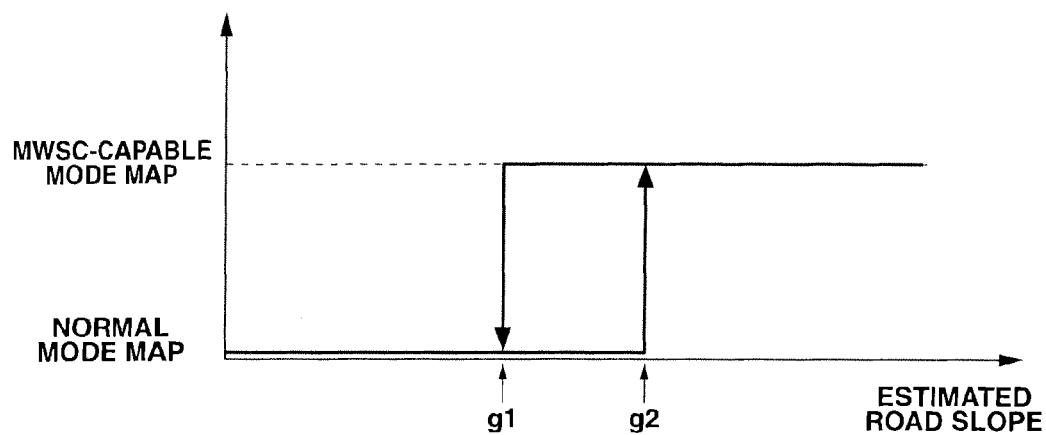
FIG. 4 is a schematic diagram showing selection logic of a mode map selecting section of the embodiment 1.

The mode selecting section 200 further has a mode map selecting section 202 that selects any one of two mode maps (described later) on the basis of the estimated road slope. FIG. 4 is a schematic diagram showing selection logic of the mode map selecting section 202. The mode map selecting section 202 changes the map from a normal mode map to an MWSC-capable mode map when the estimated slope becomes equal to or greater than a certain value g2 in a condition where the normal mode map is selected. On the other hand, the mode map selecting section 202 changes the map from the MWSC-capable mode map to the normal mode map when the estimated slope becomes less than a certain value g1 (<g2) in a condition where the MWSC-capable mode map is selected. That is to say, a hysteresis is set for the estimated slope (for the change between the both mode maps), thereby preventing a hunting upon the map change.

Figure 5:
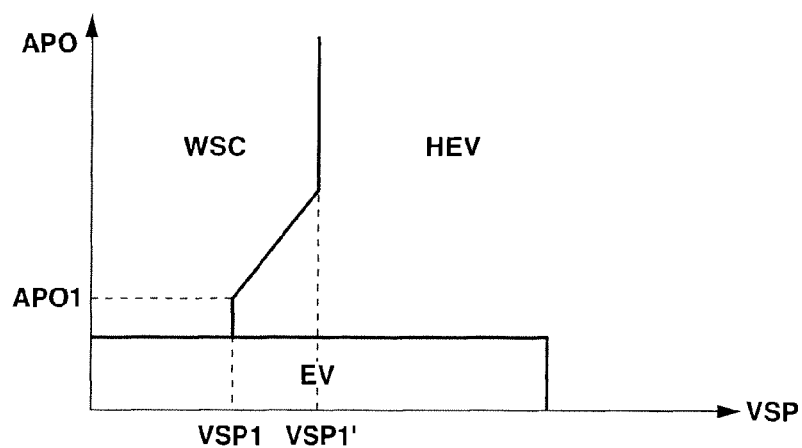
FIG. 5 is a normal mode map of the embodiment 1
Figure 6:
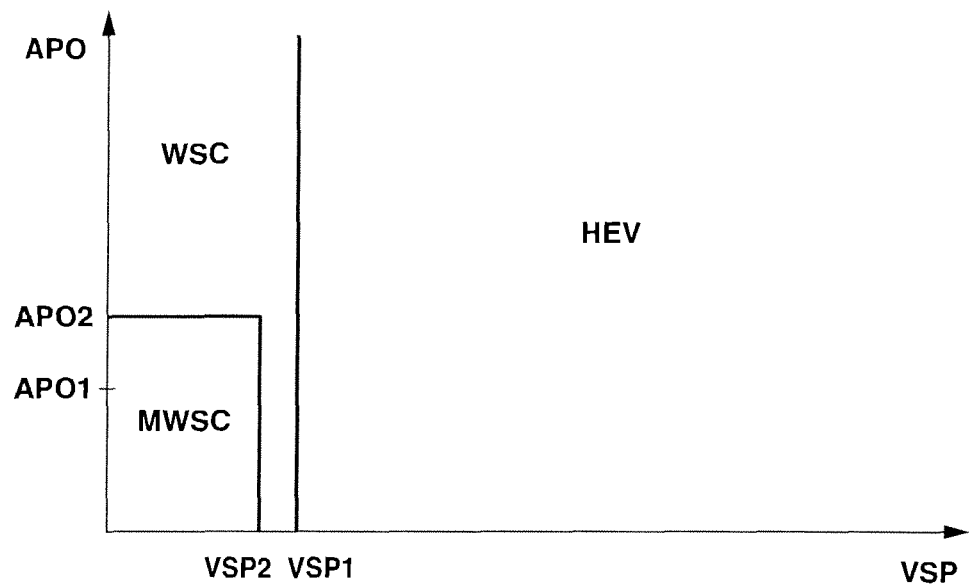
FIG. 6 is an MWSC mode map of the embodiment 1.

Next, the mode map will be explained. As the mode map, the normal mode map that is selected when the estimated slope is less than the certain value, and the MWSC-capable mode map that is selected when the estimated slope is greater than or equal to the certain value, are set. FIG. 5 illustrates the normal mode map. FIG. 6 illustrates the MWSC mode map.

In the normal mode map in FIG. 5, the EV drive mode, the WSC drive mode and the HEV drive mode are set, then on the basis of the accelerator pedal opening APO and the vehicle speed VSP, the target mode is operated. However, even if the EV drive mode is selected, in a case where the battery SOC is smaller than or equal to a predetermined value, the target mode becomes the HEV drive mode compulsorily or forcibly.

In the normal mode map in FIG. 5, with regard to an HEV WSC change line, in an area where the accelerator pedal opening APO is less than a predetermined accelerator opening APO1, the HEV WSC change line (the WSC drive mode) is set in an area where the vehicle speed VSP is lower than a lower limit vehicle speed VSP1. Here, the lower limit vehicle speed VSP1 is a vehicle speed at which the engine rpm becomes smaller than the idle speed of the engine E when the automatic transmission AT is 1st speed. In an area where the accelerator pedal opening APO is the predetermined accelerator opening APO1 or greater, since a great driving torque is required, the WSC drive mode is set up to an area of a vehicle speed VSP1' that is higher than the lower limit vehicle speed VSP1. However, this drive mode change control is configured so that when the battery SOC is low and the EV drive mode cannot be achieved, even in a case of the vehicle start, the WSC drive mode is selected.

Here, there is a case where when the accelerator pedal opening APO is large, it is difficult to achieve this request of the large accelerator pedal opening APO by the engine torque corresponding to the engine rpm around the idle speed and the torque of the motor/generator MG. Here, regarding the engine torque, as the engine rpm increases, more torque can be outputted. For this reason, even if the WSC drive mode is carried out up to a higher vehicle speed than the lower limit vehicle speed VSP1, by increasing the engine rpm and outputting the greater torque, the mode can change from the WSC drive mode to the HEV drive mode in a short time. This case corresponds to the WSC area that is extended or increased up to the vehicle speed VSP1' in FIG. 5.

On the other hand, as for the MWSC mode map in FIG. 6, the EV drive mode is not set in the MWSC mode map. This point is different from the normal mode map. Further, regarding the WSC drive mode area, it is not changed according to the accelerator pedal opening APO, and is set or defined by only the lower limit vehicle speed VSP1. This point is also different from the normal mode map. In addition, the MWSC drive mode is set in the WSC drive mode area. This point is also different from the normal mode map. The MWSC drive mode is set in an area defined by a predetermined vehicle speed VSP2 that is lower than the lower limit vehicle speed VSP1 also by a predetermined accelerator opening APO2 that is higher than the predetermined accelerator opening APO1. Details of the MWSC drive mode will be described later.

Figure 7:
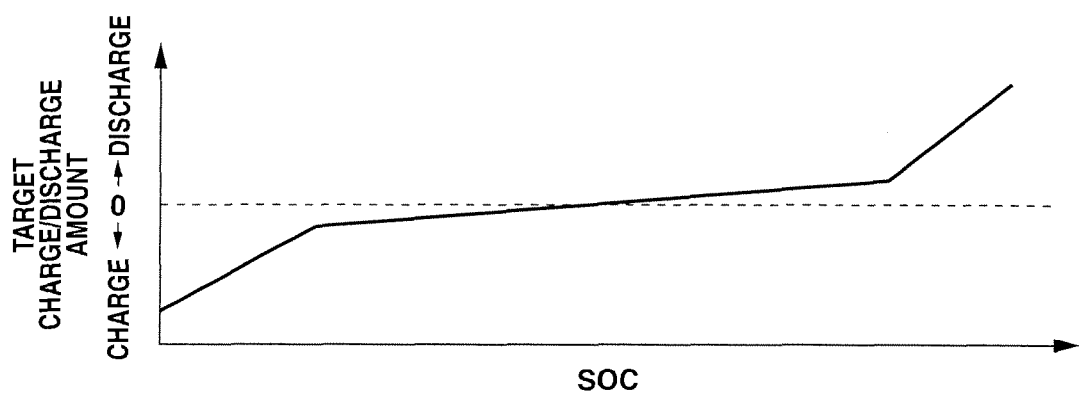
FIG. 7 is a target charge/discharge amount map of the embodiment 1.

FIG. 7 is a target charge/discharge amount map. The target charge/discharge operating section 300 calculates a target charge/discharge power tP on the basis of the battery SOC using the target charge/discharge amount map shown in FIG. 7.

The operating point commanding section 400 calculates transitional target engine torque/target engine revolution speed, target motor/generator torque/target motor/generator revolution speed, target second clutch transmission torque capacity, a target transmission ratio of the automatic transmission AT and a first clutch solenoid current command on the basis of the accelerator pedal opening APO, the target driving torque Td, the target mode, the vehicle speed VSP and the target charge/discharge power tP, as attainment targets of these operating points. Further, the operating point commanding section 400 is provided with an engine start controlling section that starts the engine E when changing the mode from the EV drive mode to the HEV drive mode.

The shift controlling section 500 controls drive of a solenoid valve in the automatic transmission AT to attain the target second clutch transmission torque capacity and the target shift stage (target shift position, the target transmission ratio) along a shift schedule set in a shift map. Here, the shift map is a map in which the target shift stage is preset according to the vehicle speed VSP and the accelerator pedal opening APO.

The gear ratio abnormality judging section 600 inputs the back-and-forth acceleration, the input revolution speed Nin and the output revolution speed Nout of the automatic transmission AT, and judges whether abnormality in a gear ratio (transmission ratio) occurs in the automatic transmission AT.

[WSC Drive Mode]

Next, the WSC drive mode will be explained in detail. The WSC drive mode is characterized by the maintaining of an engine working state, and response to a change of the target driving torque is high. More specifically, the first clutch CL1 is fully engaged, and the second clutch CL2 is slip-controlled as the transmission torque capacity according to the target driving torque, then the vehicle travels using the driving torque of the engine E and/or the motor/generator MG.

In the hybrid vehicle in the embodiment 1, an element such as a torque converter that absorbs a difference of rotation is not present. Thus, if the first clutch CL1 and the second clutch CL2 are fully engaged respectively, the vehicle speed is determined in accordance with the engine revolution speed. In order to maintain self-rotation of the engine E, the engine E has the lower limit determined by the idle speed. When a so-called idle-up operation is carried out during engine warm-up, the idle speed, i.e. the lower limit tends to further rise. Furthermore, in the condition where the required driving torque is high, there is a case where a rapid mode change to the HEV drive mode cannot be achieved.

On the other hand, in the EV drive mode, since the first clutch CL1 is disengaged, there is no limit on the lower limit of the above engine revolution speed. However, when the traveling by the EV drive mode is difficult due to a limit by the battery SOC, or when the target driving torque cannot be attained by only the motor/generator MG, there is no other way than to produce a stable torque by the engine E.

Therefore, when the vehicle is in a low vehicle speed area where the vehicle speed is lower than the speed corresponding to the above lower limit also in the area where the traveling by the EV drive mode is difficult or the target driving torque cannot be attained by only the motor/generator MG, the engine revolution speed is maintained at a predetermined lower limit revolution speed, and the second clutch CL2 is slip-controlled, then the WSC drive mode in which the vehicle travels using the engine torque is selected.

Figure 8A:
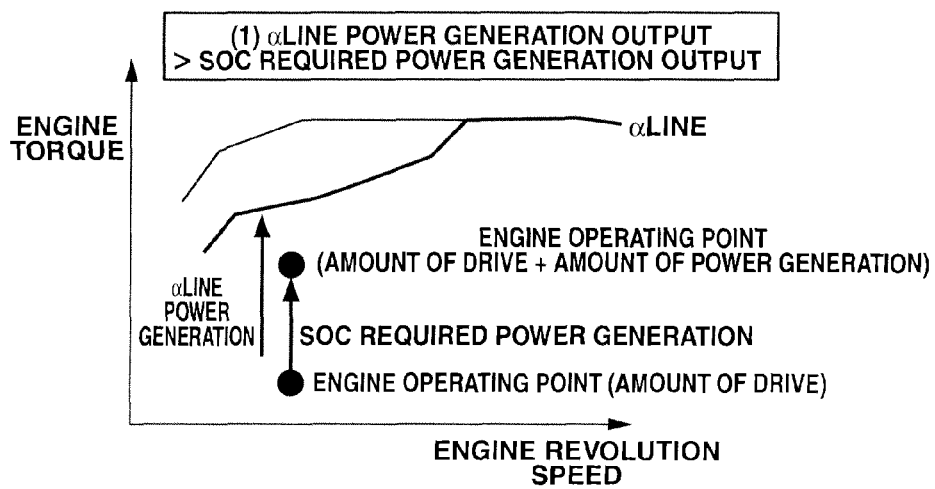
FIGS. 8A-8C are schematic diagrams showing an engine operating point setting process in a WSC drive mode of the embodiment 1.
Figure 8B:
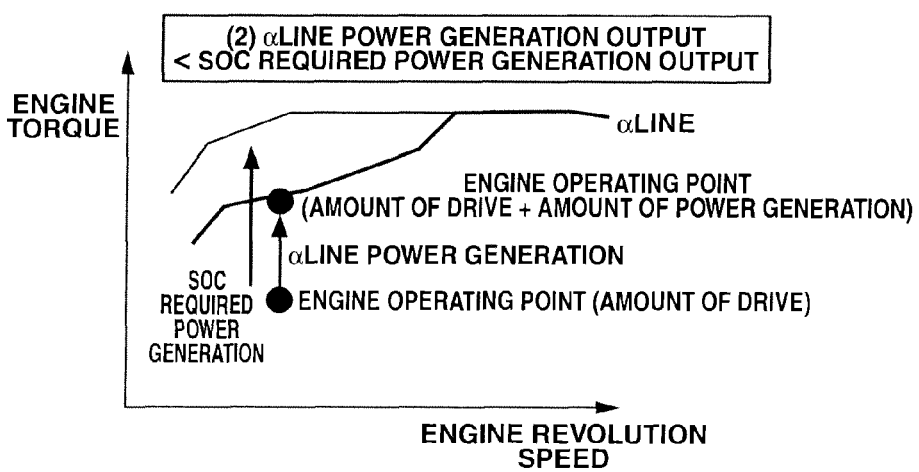
Figure 8C:
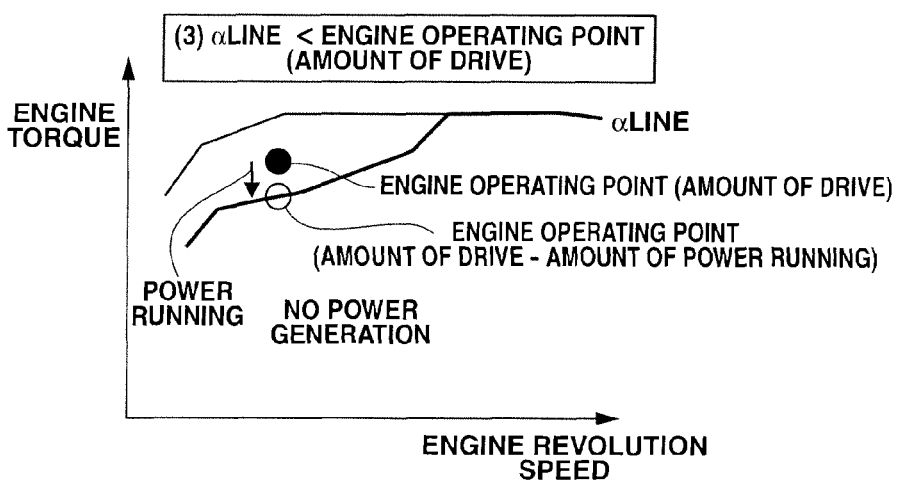
Figure 9:
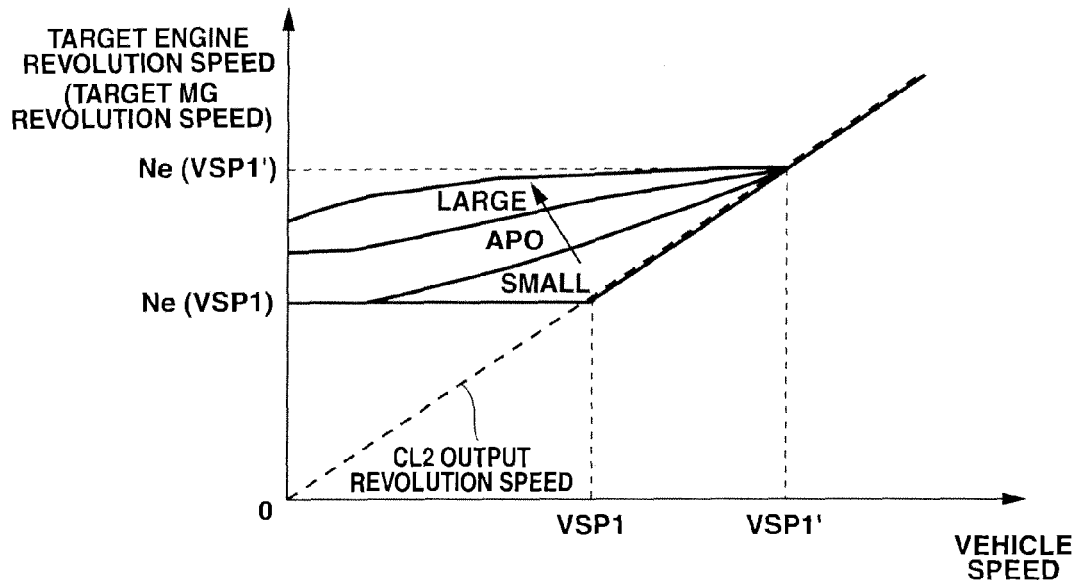
FIG. 9 is a map showing a target engine revolution speed in the WSC drive mode of the embodiment 1.

FIGS. 8A to 8C are schematic diagrams showing an engine operating point setting process in the WSC drive mode. FIG. 9 is a map showing the target engine revolution speed in the WSC drive mode.

In the WSC drive mode, when the driver operates the accelerator pedal, a target engine revolution speed characteristic according to the accelerator pedal opening is selected on the basis of FIG. 9, and the target engine revolution speed according to the vehicle speed is set along this characteristic. And by the engine operating point setting process shown in FIGS. 8A to 8C, the target engine torque corresponding to the target engine revolution speed is calculated.

Here, the operating point of the engine E is defined as a point that is determined by the engine revolution speed and the engine torque. As illustrated in FIGS. 8A to 8C, with respect to the operating point, it is preferable that the operation be executed on a line (hereinafter called an $\alpha$ line) connecting points of high output efficiency.

However, when the engine revolution speed is set as described above, there is a case where the operating point that deviates from the $\alpha$ line is selected depending on the accelerator pedal opening APO (the target driving torque) by the driver. Therefore, in order to bring the engine operating point closer to the $\alpha$ line, the engine torque is feed-forward controlled to a value based on the a line.

On the other hand, as for the motor/generator MG, a revolution speed feedback control whose target revolution speed is the set engine revolution speed is executed. Here, since the engine E and the motor/generator MG are in a directly connected state, by controlling the motor/generator MG to maintain the target revolution speed, the revolution speed of the engine E is also automatically feedback-controlled.

At this time, the torque outputted by the motor/generator MG is automatically controlled so that a difference between the target engine torque set on the basis of the $\alpha$ line and the target driving torque is compensated. The motor/generator MG is provided with a basic or fundamental torque control amount (regeneration/power running) to compensate for this difference, and further is feedback-controlled so as to agree with the target engine revolution speed.

In a case where the target driving torque is smaller than a driving torque on the $\alpha$ line at a certain engine revolution speed, when increasing an engine output torque, an engine output efficiency is increased. At this time, by collecting or recovering the energy that corresponds to the increased engine output torque by the motor/generator MG, the torque itself that is inputted to the second clutch CL2 becomes the driver's required torque, and also the power generation of good efficiency can be achieved.

However, since a torque upper limit by which the motor/generator MG can generate the power is determined by the state of the battery SOC, there is a need to consider a relation of magnitude between a required power generation output (SOC required power generation power) determined by the battery SOC and a difference (a line power generation power) between a torque at a current operating point and a torque on the $\alpha$ line.

FIG. 8A is the schematic diagram of a case where the $\alpha$ line power generation power is greater than the SOC required power generation power. Since the engine output torque cannot be increased to the SOC required power generation power or greater, the operating point cannot be moved on the $\alpha$ line. However, by moving the operating point to a higher efficiency point, a fuel efficiency is improved.

FIG. 8B is the schematic diagram of a case where the $\alpha$ Line power generation power is smaller than the SOC required power generation power. If the $\alpha$ Line power generation power is within a range of the SOC required power generation power, since the engine operating point can be moved on the $\alpha$ Line, in this case, it is possible to generate the power while maintaining the operating point of a highest fuel efficiency.

FIG. 8C is the schematic diagram of a case where the engine operating point is higher than the $\alpha$ Line.

When the operating point according to the target driving torque is higher than the $\alpha$ Line, with the proviso that there is a margin for the battery SOC, the engine torque is lowered, and the shortage is compensated by the power running of the motor/generator MG. With this operation, it is possible to attain the target driving torque while improving the fuel efficiency.

Figure 10:
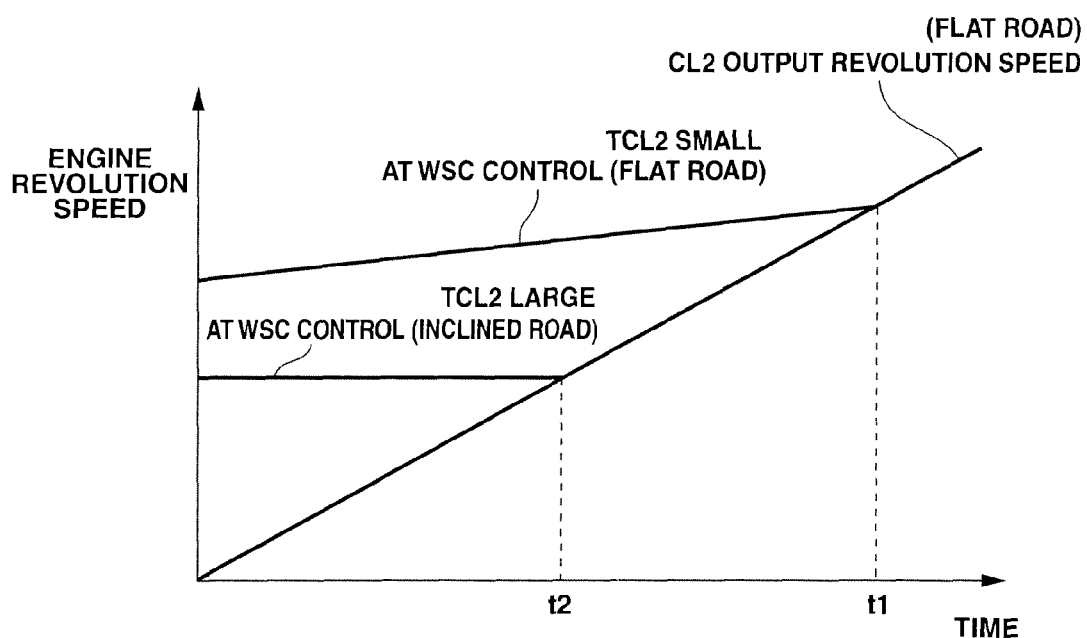
FIG. 10 is an engine revolution speed map of the embodiment 1.

Next, a change of the WSC drive mode area according to the estimated slope will be explained. FIG. 10 is an engine revolution speed map when increasing the vehicle speed in a predetermined condition.

When the accelerator pedal opening APO is greater than the accelerator opening APO1 on a flat road, the WSC drive mode area is carried out up to a vehicle speed area that is higher than the lower limit vehicle speed VSP1. At this time, as shown in the map of FIG. 9, the target engine revolution speed is gradually increased with increase in the vehicle speed. Then when the vehicle speed reaches a speed corresponding to the vehicle speed VSP1', the slip state of the second clutch CL2 disappears, and the mode is changed to the HEV drive mode.

On an inclined road whose estimated slope is greater than the certain slopes (g1 or g2), when attempting to maintain the same vehicle speed increase state as the above operation, the accelerator pedal opening APO becomes large. At this time, a second clutch transmission torque capacity TCL2 becomes large as compared with the flat road. If the WSC drive mode area is extended in this condition as shown in the map of FIG. 5, the second clutch CL2 is maintained in the slip state with a strong engagement force, then there is a risk that a heat value of the second clutch CL2 will be too large. Thus, in the MWSC-capable mode map in FIG. 6 which is selected in the case of the inclined road whose estimated slope is great, the WSC drive mode area is not extended unnecessarily, but is set up to the area corresponding to the lower limit vehicle speed VSP1. With this setting, excessive heat generation in the WSC drive mode is avoided.

[MWSC Drive Mode]

Next, the reason why the MWSC drive mode area is set will be explained. In the case where the estimated slope is greater than the certain slopes (g1 or g2), for instance, when attempting to maintain the vehicle in the stop state or in a slight vehicle speed traveling state without using the brake pedal operation, a large driving torque is required as compared with the flat road. This is because that there is a need to maintain the vehicle against the weight load of the vehicle.

From the viewpoint of the avoidance of the heat generation caused by the slip of the second clutch CL2, when there is the margin for the battery SOC, it could be possible to select the EV drive mode. In this case, when the mode area changes from the EV drive mode area to the WSC drive mode area, the engine start is needed. Thus, since the motor/generator MG outputs the driving torque while securing the torque for the engine start, a driving torque upper limit is narrowed or lessened unnecessarily.

Furthermore, when only the torque is outputted to the motor/generator MG and the rotation of the motor/generator MG is stopped or is set to an extremely low revolution speed in the EV drive mode, a lock current flows to a switching element of the inverter (a phenomenon in which the current continues flowing to one switching element occurs), and there is a possibility that durability will be lowered.

Further, at the area (the area of the vehicle speed VSP2 or less) that is lower than the lower limit vehicle speed VSP1 corresponding to the idle speed of the engine E when the automatic transmission AT is 1st speed, the revolution speed of the engine E itself cannot be reduced to be lower than the idle speed. At this time, if the WSC drive mode is selected, there is a risk that the slip amount of the second clutch CL2 is large and this affects the durability of the second clutch CL2.

Especially on the inclined road, since the large driving torque is required as compared with the flat road, the transmission torque capacity required of the second clutch CL2 becomes high, and the state of the high slip amount and the high torque is maintained. This tends to cause the deterioration of the durability of the second clutch CL2. In addition, since the increase of the vehicle speed is slow, this takes a time to change the mode to the HEV drive mode, and there is a possibility that the heat will be further generated.

Thus, the MWSC drive mode, in which the first clutch CL1 is disengaged with the engine E working, and the revolution speed of the motor/generator MG is feedback-controlled to a target revolution speed that is higher than an output speed of the second clutch CL2 by a predetermined speed while controlling the transmission torque capacity of the second clutch CL2 to the driver's target driving torque, is set.

That is to say, the second clutch CL2 is slip-controlled with the rotation state of the motor/generator MG set to a revolution speed that is lower than the idle speed of the engine. At the same time, the control of the engine E is changed to the feedback control with the idle speed being the target revolution speed. In the WSC drive mode, the engine revolution speed is maintained by the revolution speed feedback control of the motor/generator MG. On the other hand, when the first clutch CL1 is disengaged, the engine revolution speed cannot be controlled to the idle speed by the motor/generator MG. Therefore, an engine revolution speed feedback control is executed by the engine E itself.

By the setting of the MWSC drive mode area, the following effects can be obtained.
1) Since the engine E is in the working state, there is no need for the motor/generator MG to secure the driving torque required for the engine start, and the driving torque upper limit of the motor/generator MG can be large. More specifically, when thinking of a target driving torque axis, the MWSC drive mode can meet the high target driving torque as compared with the EV drive mode area.
2) Since the rotation state of the motor/generator MG is secured, the durability of the switching element etc. can be improved.
3) Since the motor/generator MG rotates at the revolution speed that is lower than the idle sped, it is possible to reduce the slip amount of the second clutch CL2, then the durability of the second clutch CL2 can be improved.

[Abnormality in Gear Ratio]

In the automatic transmission AT, a plurality of the frictional engagement elements are selectively engaged or disengaged, then the automatic transmission AT achieves a certain shift stage by combination of an engagement/disengagement state of the frictional engagement element.

However, if the valve that acts as an actuator to drive the frictional engagement element in an engagement direction sticks, or if the frictional engagement element adheres or locks with the frictional engagement element held engaged, the abnormality in the gear ratio by which the transmission ratio (also called the gear ratio) according to a desired shift stage cannot be obtained occurs. In particular, a state in which an abrupt deceleration of the vehicle occurs due to the abnormality in the gear ratio is called interlock. When the interlock occurs, the other frictional engagement element is disengaged, and a different shift stage is set, thereby avoiding the abrupt deceleration.

[μ Slip Control]

When the driver depresses the accelerator pedal during the travel in the EV drive mode, a drive area shifts from the EV drive mode to the WSC drive mode or the HEV drive mode. At this time, although the engine start is carried out, the second clutch CL2 in the automatic transmission AT is slip-controlled so that torque change caused by the engine start is not transmitted to a side of the driving wheels RL, RR.

During the execution of the EV drive mode, although normally the second clutch CL2 is fully engaged, in order to increase engine start response, the second clutch CL2 is slip-controlled, and the control is performed so that the input revolution speed Nin of the automatic transmission AT becomes higher than a value obtained by multiplying the output revolution speed Nout by the target transmission ratio. More specifically, the control is performed so that when the target transmission ratio is 1 and the output revolution speed Nout of the automatic transmission AT is 1000 [rpm], the input revolution speed Nin is 1050 [rpm]. Or the control is performed so that when the target transmission ratio is 3 and the output revolution speed Nout of the automatic transmission AT is 1000 [rpm], the input revolution speed Nin is 3050 [rpm]. Here, the transmission ratio is defined as the input revolution speed Nin/the output revolution speed Nout.

As described above, the control that controls the input revolution speed Nin to be higher than the value obtained by multiplying the output revolution speed Nout by the target transmission ratio with the second clutch CL2 slip-controlled is called a μ slip control. In the embodiment 1, irrespective of the target transmission ratio, the input revolution speed Nin is set to a value obtained by multiplying the output revolution speed Nout by the target transmission ratio also adding a slip revolution speed (50 [rpm]). Here, the slip revolution speed could be higher than 50 [rpm], or could be lower than 50 [rpm]. The slip revolution speed could be set to a variable value according to the target transmission ratio. That is, the revolution speed could be set to a certain value as long as the torque change upon the engine start can be absorbed by the second clutch CL2.

[Gear Ratio Abnormality Judgment Process]

Figure 11:
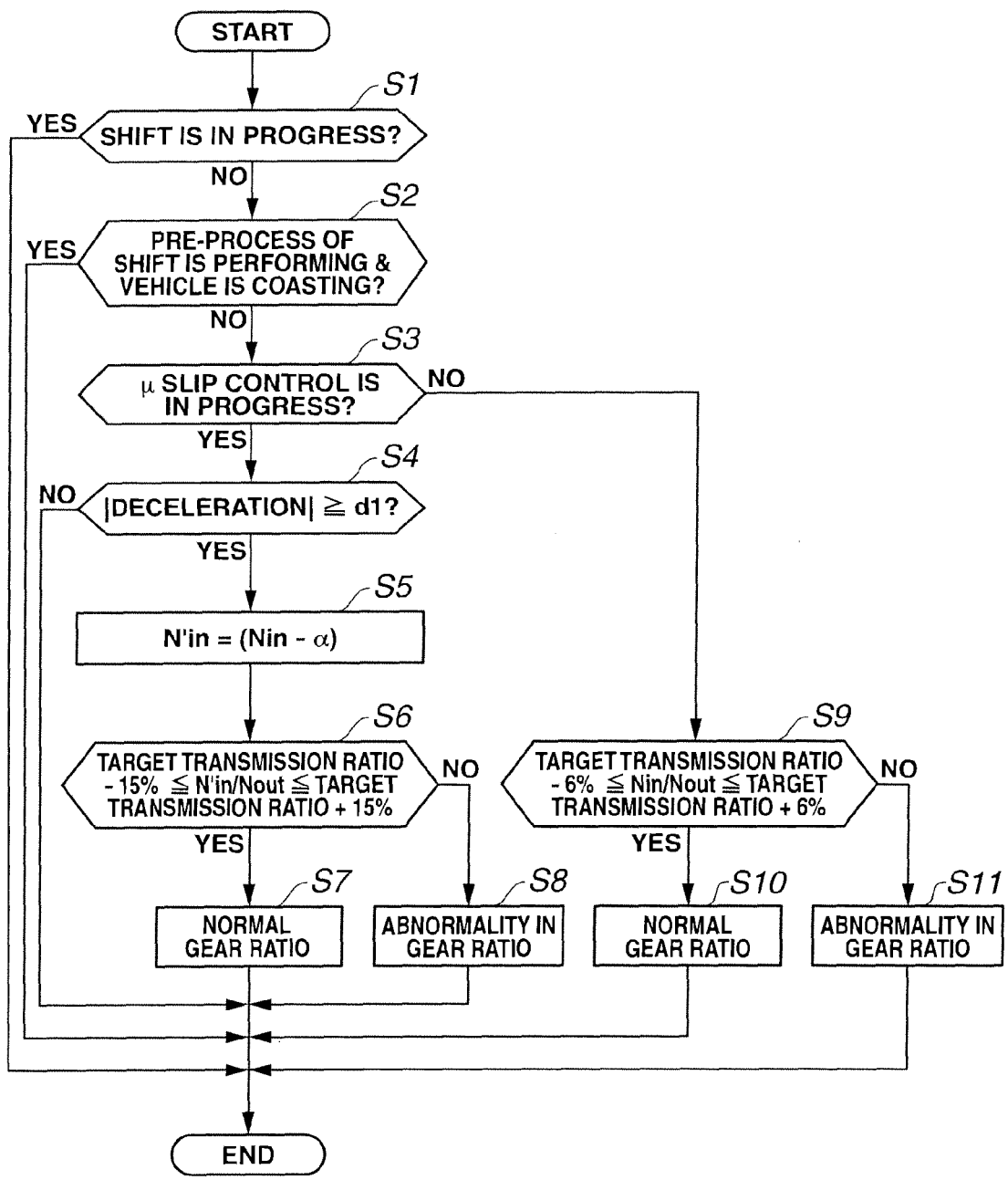
FIG. 11 is a flow chart showing a flow of a gear ratio abnormality judgment process executed in a gear ratio abnormality judging section of the embodiment 1.

FIG. 11 is a flow chart showing a flow of a gear ratio abnormality judgment process executed in the gear ratio abnormality judging section 600.

At step S1, a judgment is made as to whether or not the shift in the automatic transmission AT is in progress . If YES (the shift is in progress), this process flow is terminated. If NO (the shift is not in progress), the routine proceeds to step S2.

At step S2, a judgment is made as to whether or not a pre-process of the shift of the automatic transmission AT is performing and the vehicle is coasting. If YES (the pre-process is in progress and the vehicle is coasting), the process flow is terminated. If NO (the pre-process is not in progress or the vehicle is not coasting), the routine proceeds to step S3.

At step S3, a judgment is made as to whether or not the μ slip control is in progress. If YES (the μ slip control is in progress), the routine proceeds to step S4. If NO (the μ slip control is not in progress), the routine proceeds to step S9.

At step S4, a judgment is made as to whether or not a magnitude of the deceleration is a predetermined value d1 or greater. If YES (the magnitude of the deceleration is the predetermined value d1 or greater), the routine proceeds to step S5. If NO (the magnitude of the deceleration is less than the predetermined value d1), the process flow is terminated.

At step S5, a corrected input revolution speed N'in is calculated as a value obtained by subtracting a slip revolution speed α from the input revolution speed Nin.

At step S6, a judgment is made as to whether or not the corrected input revolution speed N'in/the output revolution speed Nout is within a range of the target transmission ratio ±15%. If YES (N'in/Nout is within the range of the target transmission ratio ±15%), the routine proceeds to step ST. If NO (N'in/Nout is out of the range of the target transmission ratio ±15%), the routine proceeds to step S8.

At step S7, it is judged that the abnormality in the gear ratio does not occur, and the process flow is terminated. At step S8, it is judged that the abnormality in the gear ratio occurs, and the process flow is terminated.

At step S9, a judgment is made as to whether or not the input revolution speed Nin/the output revolution speed Nout is within a range of the target transmission ratio ±6%. If YES (Nin/Nout is within the range of the target transmission ratio ±6%), the routine proceeds to step S10. If NO (Nin/Nout is out of the range of the target transmission ratio ±6%), the routine proceeds to step S11.

At step S10, it is judged that the abnormality in the gear ratio does not occur, and the process flow is terminated. At step S11, it is judged that the abnormality in the gear ratio occurs, and the process flow is terminated.

[Gear Ratio Abnormality Judgment Process Operation]

An operation of the gear ratio abnormality judgment process will be explained.

When the shift in the automatic transmission AT is in progress, the process flow is terminated. When the shift in the automatic transmission AT is in progress, the transmission ratio is unsteady and a change in the acceleration/deceleration is great. Because of this, it is difficult to judge whether the abnormality in the gear ratio actually occurs or the abnormality in the gear ratio occurs due to a shift characteristic. Therefore, to avoid misjudgment, the gear ratio abnormality judgment process is terminated.

When the shift in the automatic transmission AT is not in progress, the routine proceeds from step S1 to step S2 (S1→S2). At step S2, when the pre-process of the shift of the automatic transmission AT is in progress and the vehicle is coasting, the process is terminated. Just before the shift, the hydraulic pressure of the frictional engagement element that is going to be disengaged is decreased to such an extent that the frictional engagement element does not slip, and the hydraulic pressure of the frictional engagement element that is going to be engaged is increased to such an extent that the frictional engagement element does not engage, then rapid engagement/disengagement upon the shift can be achieved.

In the hybrid vehicle in the embodiment 1, during the coast, the hybrid vehicle is in the regenerative state by the motor/generator MG. Therefore, even if the hydraulic pressure of the frictional engagement element that is going to be disengaged is decreased to such an extent that the frictional engagement element does not slip when an excessive torque acts on the automatic transmission AT, there is a case where the slip occurs.

FIGS. 12A~12C are time charts of each element upon the shift. FIG. 12A shows the time chart of the shift stage. FIG. 12B shows the time chart of the transmission ratio. FIG. 12C shows the time chart of the engagement hydraulic pressure of the frictional engagement element. As shown in FIG. 12C, when the hydraulic pressure of the frictional engagement element that is going to be disengaged is decreased, because of the occurrence of the frictional engagement element slip as shown in FIG. 12B, a transmission ratio indicated by a dotted line decreases to a transmission ratio indicated by a solid line. Thus there is a possibility that the misjudgment of abnormality in the gear ratio will occur due to this slip. For this reason, to avoid the misjudgment, the gear ratio abnormality judgment process is terminated.

When the μ slip control is not in progress and the input revolution speed Nin/the output revolution speed to Nout is within the range of the target transmission ratio ±6%, the routine proceeds from step S3 to steps S9 and S10 (S3→S9→S10), and it is judged that the gear ratio is a normal gear ratio. On the other hand, when the μ slip control is not in progress and the input revolution speed Nin/the output revolution speed Nout is out of the range of the target transmission ratio ±6%, the routine proceeds from step S3 to steps S9 and S11 (S3→S9→S11), and it is judged that the abnormality in the gear ratio occurs.

Figure 13:
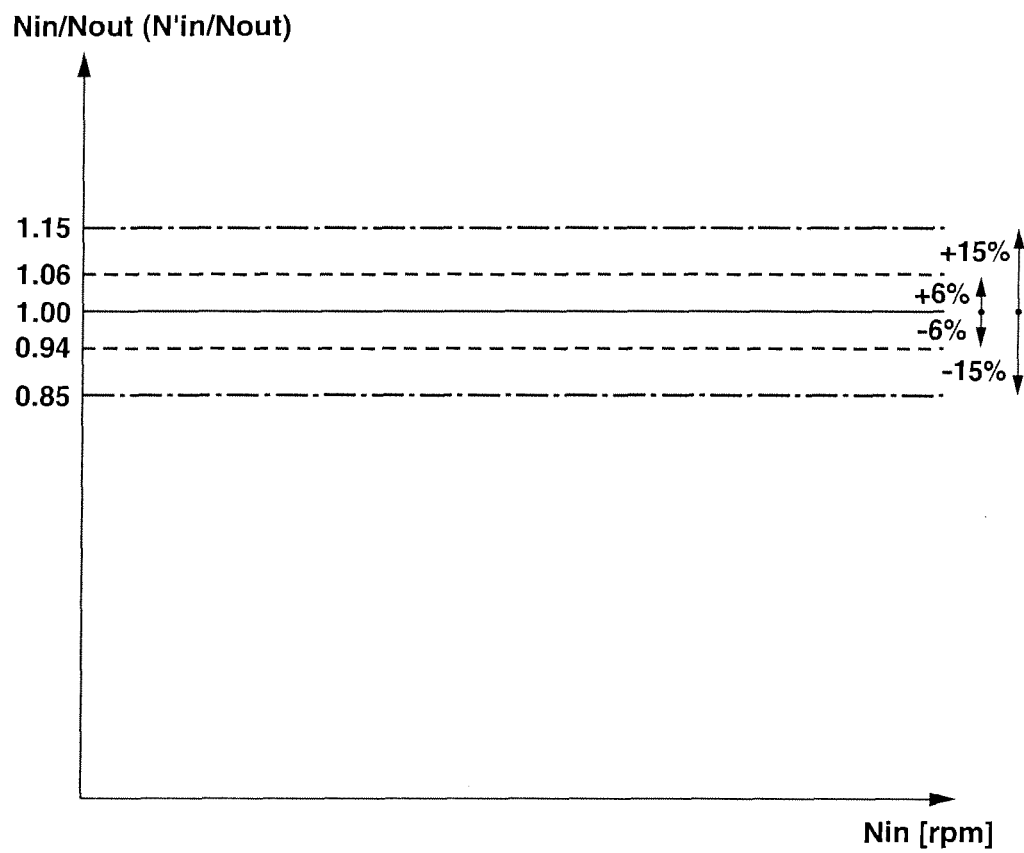
FIG. 13 is a graph showing a range of the abnormality judgment of the gear ratio when a target transmission ratio is 1.

FIG. 13 is a graph showing a range of the abnormality judgment of the gear ratio when the target transmission ratio is 1. For example, when the transmission ratio is 1, if Nin/Nout is "0.94 ≤Nin/Nout ≤1.06", it is judged that the gear ratio is the normal gear ratio. If Nin/Nout is out of this range, it is judged that the abnormality in the gear ratio occurs.

When a difference between the input revolution speed Nin/the output revolution speed Nout and the target transmission ratio is large, it is judged that the engagement/disengagement of the frictional engagement element in the automatic transmission AT is not properly carried out and the transmission ratio according to the desired shift stage cannot be attained.

When the μ slip control is in progress and the magnitude of the deceleration is the predetermined value d1 or greater, the routine proceeds from step S3 to steps S4 and S5 (S3→S4→S5). On the other hand, when the μ slip control is in progress and the magnitude of the deceleration is less than the predetermined value d1, the routine proceeds from step S3 to step S4 and END (S3→S4→END), and the process is terminated.

Since the second clutch CL2 is slip-controlled during the execution of the μ slip control, accuracy of the abnormality judgment in the main process that makes the gear ratio abnormality judgment from the difference between the input revolution speed Nin/the output revolution speed Nout and the target transmission ratio decreases. Since the interlock entails the abrupt deceleration, to avoid the abrupt deceleration, there is a need to continue the gear ratio abnormality judgment. However, in a case of the abnormality in the gear ratio which does not entail the abrupt deceleration, the gear ratio abnormality judgment of low accuracy is avoided or is not done (i.e. S4→END).

At step S5, by determining the corrected input revolution speed N'in, the transmission ratio that is increasing by performing the slip control of the second clutch CL2 is corrected.

At step S6 and at the subsequent steps, when the corrected input revolution speed N'in/the output revolution speed Nout is within the range of the target transmission ratio ±15%, the routine proceeds from step S6 to step S7 (S6→S7), and it is judged that the gear ratio is the normal gear ratio. On the other hand, when the corrected input revolution speed N'in/the output revolution speed Nout is out of the range of the target transmission ratio ±15%, the routine proceeds from step S6 to step S8 (S6→S8), and it is judged that the abnormality in the gear ratio occurs. For instance, when the transmission ratio is 1, if the N'in/Nout is "0.85 ≤N'in/Nout ≤1.15", it is judged that the gear ratio is the normal gear ratio. If N'in/Nout is out of this range, it is judged that the abnormality in the gear ratio occurs (FIG. 13).

As explained above, since the second clutch CL2 is slip-controlled during the execution of the μ slip control, the accuracy of the abnormality judgment in the main process that makes the gear ratio abnormality judgment from the difference between the input revolution speed Nin/the output revolution speed Nout and the target transmission ratio decreases. By setting the range of the abnormality judgment of the gear ratio when the μ slip control is in progress (i.e. the range at step S6) to be wider than the range of the abnormality judgment of the gear ratio when the μ slip control is not in progress (i.e. the range at step S9), a possibility of the misjudgment of abnormality in the gear ratio can be reduced.

[Operation]

The abnormality in the gear ratio of the automatic transmission AT can be judged by the fact that the actual transmission ratio (the input revolution speed Nin/the output revolution speed Nout) is out of the predetermined range of the target transmission ratio. However, since the input revolution speed Nin is set to be higher when the p slip control is in progress, in the case of this judgment manner, there is a possibility that the misjudgment of abnormality in the gear ratio will occur.

Therefore, in the embodiment 1, when the μ slip control is in progress, the actual transmission ratio (the input revolution speed Nin/the output revolution speed Nout) is corrected by an amount of the slip revolution speed α. Then when this value (i.e. the corrected input revolution speed N'in/the output revolution speed Nout) is out of the predetermined range of the target transmission ratio, it is judged that the abnormality in the gear ratio in the automatic transmission AT occurs. That is, the corrected input revolution speed N'in is determined by subtracting the slip revolution speed α from the input revolution speed Nin, and the gear ratio abnormality judgment is made using the corrected transmission ratio (the corrected input revolution speed N'in/the output revolution speed Nout).

With this correction and judgment, even when the μ slip control is in progress, the gear ratio abnormality judgment can be carried out, and the misjudgment of abnormality in the gear ratio can be reduced.

Further, since the second clutch CL2 is slip-controlled during the execution of the μ slip control, the accuracy of the abnormality judgment of the gear ratio decreases.

Thus, in the embodiment 1, the predetermined range (the target transmission ratio ±15%) which is used for judgment of the abnormality in the gear ratio when the μ slip control is in progress is set to be wider than the predetermined range (the target transmission ratio ±6%) which is used for judgment of the abnormality in the gear ratio when the μ slip control is not in progress.

With this setting, even if the actual transmission ratio changes due to disturbance during the execution of the μ slip control, it is possible to suppress the misjudgment of the occurrence of the abnormality in the gear ratio.

Further, since the second clutch CL2 is slip-controlled during the execution of the μ slip control, the accuracy of the abnormality judgment of the gear ratio decreases.

Thus, in the embodiment 1, when the magnitude of the deceleration is less than the predetermined value dl during the execution of the μ slip control, the gear ratio abnormality judgment is not carried out.

Therefore, upon the occurrence of the abnormality in the gear ratio, when the interlock entailing the abrupt deceleration occurs, the gear ratio abnormality judgment is carried out, and the abrupt deceleration can be avoided. On the other hand, in the case of the abnormality in the gear ratio which does not entail the abrupt deceleration, the gear ratio abnormality judgment of low accuracy is avoided or is not carried out.

[Effect]

Next, effects of the embodiment 1 will be explained. The automatic transmission of the embodiment 1 has the following effects.

(1) The automatic transmission which changes and outputs the output revolution speed of the driving source (the engine E and the motor/generator MG) that outputs the driving torque in the vehicle, has: the shift controlling section 500 (a transmission control section) that performs the control so that the transmission ratio defined as the ratio of the input revolution speed Nin of the automatic transmission AT with respect to the output revolution speed Nout of the automatic transmission AT becomes the target transmission ratio; the shift controlling section 500 (a slip control section) that μ slip-controls the frictional engagement element in the automatic transmission AT so that the input revolution speed Nin of the automatic transmission AT becomes the value obtained by multiplying the output revolution speed Nout of the automatic transmission AT by the target transmission ratio also adding the predetermined slip revolution speed a; and the gear ratio abnormality judging section 600 (an abnormality judgment section) that judges that (a) when the μ slip control is not in progress, if the actual transmission ratio (Nin/Nout) is out of the predetermined range of the target transmission ratio, the abnormality in the gear ratio occurs in the automatic transmission AT, and (b) when the μ slip control is in progress, if the value (N'in/Nout) obtained by correcting the actual transmission ratio (Nin/Nout) on the basis of the slip revolution speed a is out of the predetermined range of the target transmission ratio, the abnormality in the gear ratio occurs in the automatic transmission AT.

Therefore, even when the μ slip control is in progress, the gear ratio abnormality judgment can be carried out, and the misjudgment of abnormality in the gear ratio can be reduced.

(2) The automatic transmission provided, through the frictional engagement element, with the driving torque that is outputted by the driving source (the engine E and the motor/generator MG) in the vehicle, the automatic transmission changing the revolution speed which the driving source (E; MG) outputs and outputting the revolution speed to the driving wheels RL, RR, the automatic transmission has: the input rpm sensor 20 (a first revolution speed sensor) that is provided between the driving source (E; MG) and the frictional engagement element and detects the input revolution speed Nin that is the revolution speed at the input shaft side of the automatic transmission AT; the output rpm sensor 21 (a second revolution speed sensor) that is provided between the automatic transmission AT and the driving wheels RL, RR and detects the output revolution speed Nout that is the revolution speed at the output shaft side of the automatic transmission AT; the shift controlling section 500 (the transmission control section) that performs the control so that the transmission ratio defined as the ratio of the input revolution speed Nin with respect to the output revolution speed Nout becomes the target transmission ratio; the shift controlling section 500 (the slip control section) that slip-controls the frictional engagement element so that the input revolution speed Nin becomes the value obtained by multiplying the output revolution speed Nout by the target transmission ratio also adding the predetermined slip revolution speed α; and the gear ratio abnormality judging section 600 (the abnormality judgment section) that judges that (a) when the slip control is not in progress, if the actual transmission ratio (Nin/Nout)

is out of the predetermined range of the target transmission ratio, the abnormality occurs in the automatic transmission AT, and (b) when the slip control is in progress, if the value (N'in/Nout) obtained by correcting the actual transmission ratio (Nin/Nout) on the basis of the slip revolution speed α is out of the predetermined range of the target transmission ratio, the abnormality occurs in the automatic transmission AT.

Therefore, even when the μ slip control is in progress, the gear ratio abnormality judgment can be carried out, and the misjudgment of abnormality in the gear ratio can be reduced.

(3) The automatic transmission changing the revolution speed outputted by the driving source (the engine E and the motor/generator MG) that outputs the driving torque of the vehicle and outputting the changed revolution speed to the driving wheels RL, RR through the frictional engagement element, the automatic transmission has: the input rpm sensor 20 (the first revolution speed sensor) that is provided between the driving source (E; MG) and the automatic transmission AT and detects the input revolution speed Nin that is the revolution speed at the input shaft side of the automatic transmission AT; the output rpm sensor 21 (the second revolution speed sensor) that is provided between the frictional engagement element and the driving wheels RL, RR and detects the output revolution speed Nout that is the revolution speed at the output shaft side of the automatic transmission AT; the shift controlling section 500 (the transmission control section) that performs the control so that the transmission ratio defined as the ratio of the input revolution speed Nin with respect to the output revolution speed Nout becomes the target transmission ratio; the shift controlling section 500 (the slip control section) that slip-controls the frictional engagement element so that the input revolution speed Nin becomes the value obtained by multiplying the output revolution speed Nout by the target transmission ratio also adding the predetermined slip revolution speed α; and the gear ratio abnormality judging section 600 (the abnormality judgment section) that judges that (a) when the slip control is not in progress, if the actual transmission ratio (Nin/Nout) is out of the predetermined range of the target transmission ratio, the abnormality occurs in the automatic transmission AT, and (b) when the slip control is in progress, if the value (N'in/Nout) obtained by correcting the actual transmission ratio (Nin/Nout) on the basis of the slip revolution speed α is out of the predetermined range of the target transmission ratio, the abnormality occurs in the automatic transmission AT.

Therefore, even when the μ slip control is in progress, the gear ratio abnormality judgment can be carried out, and the misjudgment of abnormality in the gear ratio can be reduced.

(4) In the automatic transmission AT, the gear ratio abnormality judging section 600 sets the predetermined range that is used for judgment of the occurrence of the abnormality in the gear ratio in the automatic transmission AT when the μ slip control is in progress to be wider than the predetermined range that is used when the μ slip control is not in progress.

Thus, even if the actual transmission ratio changes due to disturbance during the execution of the μ slip control, it is possible to suppress the misjudgment of the occurrence of the abnormality in the gear ratio.

(5) In the automatic transmission AT, when the μ slip control is in progress, if the magnitude of the deceleration is less than the predetermined value d1, the gear ratio abnormality judging section 600 does not carry out the abnormality judgment.

Thus, upon the occurrence of the abnormality in the gear ratio, when the interlock entailing the abrupt deceleration occurs, the gear ratio abnormality judgment is carried out, and the abrupt deceleration can be avoided. On the other hand, in the case of the abnormality in the gear ratio which does not entail the abrupt deceleration, the gear ratio abnormality judgment of low accuracy is avoided or is not carried out.

[Other Embodiments]

The embodiment of the present invention has been explained above on the basis of the embodiment 1. However, the configuration or system of the present invention is not limited to the embodiment 1.

In the embodiment 1, the case of FR-type hybrid vehicle has been explained. However, the present invention can also be applied to FF-type hybrid vehicle.

In the embodiment 1, the corrected input revolution speed N'in is determined by subtracting the slip revolution speed α from the input revolution speed Nin, and the corrected transmission ratio is set as the corrected input revolution speed N'in/the output revolution speed Nout. However, a corrected output revolution speed N'out is determined by adding a value obtained by dividing the slip revolution speed α by the transmission ratio to the output revolution speed Nout, and a corrected transmission ratio could be set as the input revolution speed Nin/the corrected output revolution speed N'out. Or, a corrected transmission ratio might be set as a value obtained by multiplying the actual transmission ratio (the input revolution speed Nin/the output revolution speed Nout) by ((the input revolution speed Nin—the slip revolution speed α)/the input revolution speed Nin).

In the embodiment 1, as the second clutch CL2 that is slip-controlled, the frictional engagement element in the automatic transmission AT is used. However, the second clutch CL2 could be provided as a different element from the frictional engagement element of the automatic transmission AT. In this case, the second clutch CL2 could be arranged between the motor/generator MG of the driving source and the automatic transmission AT, or may be arranged between the automatic transmission AT and the driving wheels (RL, RR). In the case where the second clutch CL2 is arranged between the motor/generator MG and the automatic transmission AT, the input revolution speed Nin that is the revolution speed of the input shaft of the automatic transmission AT is detected by a revolution speed sensor provided between the motor/generator MG and the second clutch CL2. In the case where the second clutch CL2 is arranged between the automatic transmission AT and the driving wheels (RL, RR), the output revolution speed Nout that is the revolution speed of the output shaft of the automatic transmission AT is detected by a revolution speed sensor provided between the second clutch CL2 and the driving wheels (RL, RR).

In the embodiment 1, as the automatic transmission, the multi-range transmission having forward 7 speeds and reverse 1 speed is described. However, the present invention can also be applied to a continuously variable transmission such as a belt type CVT (belt-drive CVT), a chain type CVT and a multi-disc type CVT. For instance, in the belt type CVT, when there arises a slip (belt slip) between a belt and a pulley, a difference arises between the target transmission ratio and the actual transmission ratio. In this case, the CVT is in a state in which abnormality in the transmission ratio occurs. The present invention can also be employed for and applied to such abnormality judgment (belt slip judgment).

The entire contents of Japanese Patent Applications No. 2010-242609 filed on Oct. 28, 2010 and No. 2011-232851 filed on Oct. 24, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission which changes and outputs an output revolution speed of a driving source that outputs a driving torque in a vehicle, the automatic transmission comprising:
    a transmission control section that performs a control so that a transmission ratio defined as a ratio of an input revolution speed of the automatic transmission with respect to an output revolution speed of the automatic transmission becomes a target transmission ratio;
    a slip control section that slip-controls a frictional engagement element in the automatic transmission so that the input revolution speed of the automatic transmission becomes a value obtained by multiplying the output revolution speed of the automatic transmission by the target transmission ratio also adding a predetermined slip revolution speed; and
    an abnormality judgment section that judges that;
        (a) when the slip control is not in progress, if an actual transmission ratio is out of a predetermined range of the target transmission ratio, abnormality occurs in the automatic transmission, and
        (b) when the slip control is in progress, if a value obtained by correcting the actual transmission ratio on the basis of the slip revolution speed is out of the predetermined range of the target transmission ratio, the abnormality occurs in the automatic transmission.

2. An automatic transmission provided, through a frictional engagement element, with a driving torque that is outputted by a driving source in a vehicle, the automatic transmission changing a revolution speed which the driving source outputs and outputting the revolution speed to a driving wheel, the automatic transmission comprising:
    a first revolution speed sensor that is provided between the driving source and the frictional engagement element and detects an input revolution speed that is a revolution speed at an input shaft side of the automatic transmission;
    a second revolution speed sensor that is provided between the automatic transmission and the driving wheel and detects an output revolution speed that is a revolution speed at an output shaft side of the automatic transmission;
    a transmission control section that performs a control so that a transmission ratio defined as a ratio of the input revolution speed with respect to the output revolution speed becomes a target transmission ratio;
    a slip control section that slip-controls the frictional engagement element so that the input revolution speed becomes a value obtained by multiplying the output revolution speed by the target transmission ratio also adding a predetermined slip revolution speed; and
    an abnormality judgment section that judges that;
        (a) when the slip control is not in progress, if an actual transmission ratio is out of a predetermined range of the target transmission ratio, abnormality occurs in the automatic transmission, and
        (b) when the slip control is in progress, if a value obtained by correcting the actual transmission ratio on the basis of the slip revolution speed is out of the predetermined range of the target transmission ratio, the abnormality occurs in the automatic transmission.

3. An automatic transmission changing a revolution speed outputted by a driving source that outputs a driving torque of a vehicle and outputting the changed revolution speed to a driving wheel through a frictional engagement element, the automatic transmission comprising:
    a first revolution speed sensor that is provided between the driving source and the automatic transmission and detects an input revolution speed that is a revolution speed at an input shaft side of the automatic transmission;
    a second revolution speed sensor that is provided between the frictional engagement element and the driving wheel and detects an output revolution speed that is a revolution speed at an output shaft side of the automatic transmission;
    a transmission control section that performs a control so that a transmission ratio defined as a ratio of the input revolution speed with respect to the output revolution speed becomes a target transmission ratio;
    a slip control section that slip-controls the frictional engagement element so that the input revolution speed becomes a value obtained by multiplying the output revolution speed by the target transmission ratio also adding a predetermined slip revolution speed; and
    an abnormality judgment section that judges that;
        (a) when the slip control is not in progress, if an actual transmission ratio is out of a predetermined range of the target transmission ratio, abnormality occurs in the automatic transmission, and
        (b) when the slip control is in progress, if a value obtained by correcting the actual transmission ratio on the basis of the slip revolution speed is out of the predetermined range of the target transmission ratio, the abnormality occurs in the automatic transmission.

4. The automatic transmission as claimed in claim 1, wherein:
    the abnormality judgment section sets the predetermined range that is used for judgment of the occurrence of the abnormality in the automatic transmission when the slip control is in progress to be wider than the predetermined range that is used when the slip control is not in progress.

5. The automatic transmission as claimed in claim 1, wherein:
    when the slip control is in progress, if a magnitude of a deceleration is less than a predetermined value, the abnormality judgment section does not carry out the abnormality judgment.

6. The automatic transmission as claimed in claim 2, wherein:
    the abnormality judgment section sets the predetermined range that is used for judgment of the occurrence of the abnormality in the automatic transmission when the slip control is in progress to be wider than the predetermined range that is used when the slip control is not in progress.

7. The automatic transmission as claimed in claim 2, wherein:
    when the slip control is in progress, if a magnitude of a deceleration is less than a predetermined value, the abnormality judgment section does not carry out the abnormality judgment.

8. The automatic transmission as claimed in claim 3, wherein:
    the abnormality judgment section sets the predetermined range that is used for judgment of the occurrence of the abnormality in the automatic transmission when the slip control is in progress to be wider than the predetermined range that is used when the slip control is not in progress.

9. The automatic transmission as claimed in claim 3, wherein:
when the slip control is in progress, if a magnitude of a deceleration is less than a predetermined value, the abnormality judgment section does not carry out the abnormality judgment.

* * * * *